March 1, 1960 B. W. OSWALT 2,926,498

HYDRAULIC ADJUSTING MECHANISM

Filed March 10, 1958

INVENTOR.
BURLIN W. OSWALT
BY
J.W. Haney
ATTY.

United States Patent Office 2,926,498
Patented Mar. 1, 1960

2,926,498

HYDRAULIC ADJUSTING MECHANISM

Burlin W. Oswalt, Union, Ohio, assignor to The B. F. Goodrich Company, New York, N.Y., a corporation of New York Application March 10, 1958, Serial No. 720,191

6 Claims. (Cl. 60—54.5)

This invention relates to improvements in mechanisms for automatically adjusting hydraulic brakes to maintain a particular uniform release clearance between the engageable braking members and thereby provide a uniform pedal action for a braking system. The mechanism of this invention functions to effect such adjustments by automatically metering hydraulic fluid to or from the hydraulic motor of a brake during successive actuations of the brake. Although the mechanism has special utility for brakes, it may be used advantageously for regulating hydraulic motors in environments other than brakes where service conditions are similar to brakes.

The mechanism of this invention is a two-way adjuster. That is to say, it is adapted to compensate both for wear of the brake linings and also for changes in the release clearance brought about by abnormal thermal expansion and/or resilient deflection of the engageable braking members when the brake is engaged. In accomplishing these results the present adjuster mechanism has the same mode of operation and embodies generally the structural features of the diaphragm-type adjuster described and claimed in my copending application Serial No. 696,718 filed November 15, 1957. The present mechanism differs, however, from the mechanism disclosed in application Serial No. 696,718 in that in the present mechanism a single diaphragm has been substituted to accomplish the same functions for which two independent diaphragms were used in the prior mechanisms. This improved single-diaphragm construction simplifies the assembly of the mechanism and significantly reduces both its bulk and cost of manufacturing. These advantages are attained while maintaining and indeed even improving the efficiency of the mechanism.

One form of adjuster mechanism embodying the improved features in accordance with this invention is shown in the accompanying drawing in which.

Figure 1:
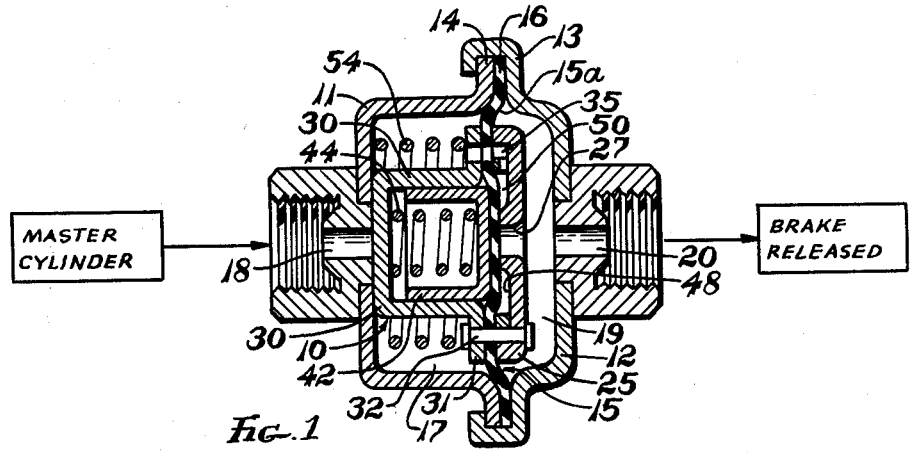
Fig. 1 is a longitudinal axial sectional view of the adjuster mechanism showing the positions of the parts while a brake associated therewith is released.

Referring to the drawings, the adjuster mechanism selected for illustration includes an actuated member in the form of a floating piston assembly 10 housed inside a hollow outer casing member 11. Casing member 11 includes an end closure cap 12 which in this construction includes a rim flange 13 which is rolled over a rim flange 14 of member 11 to fasten the cap in place.

Fitting transaxially across the entire interior of the casing member 11 is a flexible oil-impervious rubber diaphragm 15 having the shape of a circular disc. The peripheral margin 16 of this diaphragm is clamped between the rim flanges 13 and 14 of the casing members to serve as a sealing gasket between the casing members and to anchor the diaphragm securely to the casing. The floating piston assembly 10 is fastened to this diaphragm 15 so that the assembly 10 is suspended in radially spaced relation to the interior wall of the casing. The piston assembly 10 together with the peripheral portion 15a of the diaphragm define with the interior of the casing 11 an inlet chamber 17 (the so-called "first chamber") into which fluid from a suitable pressure generating source (for example, a master cylinder as schematically represented) is connected through inlet opening 18. On the opposite side of diaphragm 15 in casing 11 there is a corresponding outlet chamber 19 (the so-called "second chamber") which is connected through outlet opening 20 to a brake motor (schematically indicated).

In response to the resultant force of differential fluid pressure in chambers 17 and 19, the floating piston assembly 10 is displaceable axially of casing 11, the peripheral portions 15a of the diaphragm flexing to accommodate the displacement of the piston assembly. The piston assembly 10 is capable of a total axial displacement in the casing from its released position in Fig. 1 to its actuated position in Fig. 2. The outer margin 16 of the diaphragm 15 is clamped by flanges 13 and 14 in a plane located midway between these extreme positions of the piston assembly and, moreover, the inside surfaces of the casing members near the rim flanges are rounded as at 21 to provide space for portions 15a to flex without bruising, pinching or chafing the diaphragm as the piston assembly is reciprocated.

The floating piston assembly 10 includes a rigid dish-shaped piston 25 (see Fig. 1) having a peripheral rim 26 and a central port 27 surrounded by a boss 28 the radial face 29 of which boss serves as a valve seat as subsequently explained. The piston 25 is located on the outlet chamber side of the diaphragm 15 and fits with its rim 26 bearing against the diaphragm. On the opposite or inlet side of the diaphragm the piston assembly 10 includes a cup-shaped inner casing 30 having radial rim flanges 31 bearing against the diaphragm immediately opposite rim 26 of piston 25. Piston 25 is fastened to inner casing 30 by rivets 32 (Fig. 1) which extend through the flange 31 and the diaphragm 15 and the piston 25 quite close to the rim 26. Preferably there are three such rivets as fastening rivet 32, angularly offset 120° from each other in the same relative position as the rivet 32 shown in Fig. 1. These rivets when tightened draw the rim 26 of the piston and flange 31 tightly against opposing portions of the diaphragm to form a fluid tight seal around both rim 26 and around flange 31.

Figure 4:
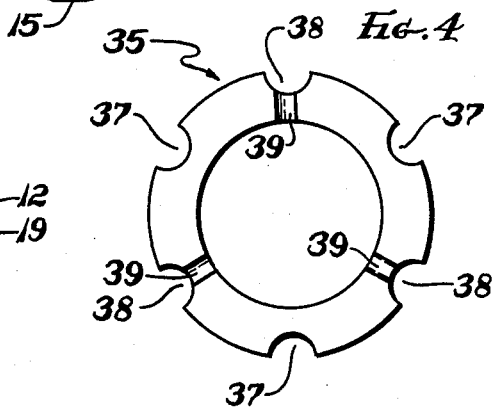
Fig. 4 is a view of a slotted spacer ring 35 of the mechanism, the construction of which ring is somewhat obscured in the other views.

The seal between flange 31 and the piston 25 is further augmented by a slotted spacer ring 35 shown in Fig. 4. This ring 35 fits snugly inside the rim 26 of piston 25 and in the assembly 10 the flat radial side 36 of this ring bears against the diaphragm and a portion of the opposing rim flange 31. In the periphery of ring 35 there are three axial slots 37 offset 120° apart through which slots extend the rivets 32 for fastening piston 25 to flange 31.

Additionally, in the periphery of ring 35 there are three more axial slots numbered 38 which slots intersect with radial slots 39 on the face of the ring embraced by piston 25. The radial slots 39 extend to the inner periphery of the ring. The sets of slots 38 and 39 form part of the hydraulic passages through which fluid is conducted between chambers 17 and 19 of the casing under circumstances herein after described.

Figure 3:
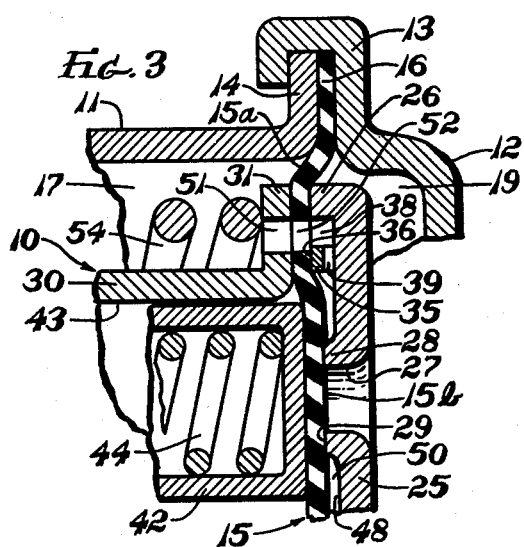
Fig. 3 is a fragmentary detail view drawn on an expanded scale to more clearly show certain details of the construction.

The central region 15b of the diaphragm 15 (which region is bounded by the diaphragm portions clamped against flange 31) covers port 27 and valve seat 29 on boss 28 (see Fig. 3) and is adapted to be flapped toward or away from valve seat 29. Under the usual conditions, when the floating piston is retracted as in Fig. 1, central region 15b is pressed against valve seat 29 to close port 27 by a cup-shaped plunger piston 42. The latter piston 42 is housed in a bore 43 of inner casing 30 and is biased forwardly against the diaphragm by a spring 44 caged under compression in the casing 30. The space inside inner casing 30 behind plunger piston 42 is maintained empty of fluid at all times by the clamping engagement of flange 31 on the diaphragm and the impervious nature of the diaphragm. In the closed position of the diaphragm, its central region 15b is exposed directly to fluid in the outlet chamber 19 acting through port 27.

The interior recessed face 48 of piston 25 (see Fig. 3) between boss 28 and ring 35 forms an annular channel 50 around the valve seat 29. This channel is in communication with fluid in the inlet chamber 17 through the radial and axial slots 39 and 38, respectively, in spacer ring 35, and through a passage 51 in flange 31 and another passage 52 in the portion of the diaphragm clamped between flange 31 and rim 26 of piston 25. The ring 35 and associated parts are assembled so that passages 49, 50, and slots 38 and 39 are in register to conduct fluid from inlet chamber 17 into the channel 50. The fluid thus received in channel 50 is effective to act against the annular portion of the central region 15b of the diaphragm facing the channel 50 against the biasing force of spring 44.

Engagement of the central region 15b of the diaphragm with the valve seat as in Fig. 1 prevents communication of fluid between chambers 17 and 19. The central region 15b is operable for displacement away from valve seat 29 to open port 27 against the biasing force of spring 44 in response to either a predetermined fluid pressure in outlet chamber 19 acting through port 27, or a predetermined fluid pressure in inlet chamber 17 acting through the passages and ports leading into channel 50. The valve seat 29, the central region 15b of the diaphragm together with plunger 42 and its biasing spring 44 thus form a valve mechanism for regulating flow of fluid through port 27.

When installed in a typical brake system, both the inlet and outlet chambers 17 and 19 are entirely filled with fluid. The outlet chamber 19 together with the fluid contained in port 27 and in the tubing (not shown) to the brake motor is hereinafter called the "fluid link" of the brake system. The back pressure of this fluid link on outlet side of the diaphragm and the piston assembly 10 (resulting from the brake retractor springs, not shown) is effective to urge the piston assembly 10 to and maintain it in its inactive position as in Fig. 1 so long as braking pressure is released on the master cylinder.

The adjuster mechanism further includes a main spring 54 which externally surrounds the inner casing 30 in inlet chamber 17 and which is compressed between the inlet end of the outer casing 11 and the flange 31 of the inner casing 30 by the back pressure of the fluid link so that the forward face of the piston assembly 10 is biased against the fluid in outlet chamber 19. Spring 54 cooperates with the valve action of the central region 15b of the diaphragm in resetting the release clearance desired after an over-adjusted condition of the brake occurs, as will be more fully brought out in the following explanation of the operation of the mechanism.

The diaphragm 15 is preferably a rubber-like material chemically resistant to the particular hydraulic fluid used in the brake system. Neoprene compounds are generally suitable for hydraulic oil presently used for brakes of automotive vehicles. The diaphragm may be reinforced with a suitable fabric (not shown).

When the brake system is pressurized by the master cylinder, the piston assembly 10 is moved rightward against fluid in outlet chamber 19 thus displacing the fluid link to energize the brake motor (not shown). The central region 15b of the diaphragm is usually pressed tightly against valve seat 29 by plunger piston 42 during rightward movement of the piston assembly 10.

This adjusting mechanism is preferably designed so that the volume of fluid in its outlet chamber 19 is substantially equal to the displacement volume of the brake motor when there is a preselected release clearance between the braking members. Thus for example, if the engageable braking members (e.g. a brake shoe and a brake drum, not shown), are separated at some preselected clearance when the brake system is pressurized, then the piston assembly 10 will bottom against end cap 12 as in Fig. 2 at substantially the same time the shoes firmly engage the drum.

As soon as, or close to the time piston 25 bottoms against end cap 12, the pressure of the hydraulic fluid in inlet chamber 41 will reach the full rated pressure generated by the master cylinder. When this occurs, full system pressure is then being transmitted through passages 51 and 52 and slots 38 and 39 into annular channel 50 and acting against the annular area of the diaphragm covering channel 50. This annular area is of a size such that when it is exposed to full system pressure, the force thereon is sufficient to overcome the biasing spring 44 and force the central region 15b of the diaphragm away from the valve seat 29 so that there is direct communication between the inlet chamber 17 through port 27 into outlet chamber 19. Ordinarily there will be little or no flow of inlet fluid across the valve seat 29 and through port 27 immediately upon the opening of port 27, however, because the pressure in the fluid link under these conditions will then be substantially equal to the pressure of the fluid in the inlet chamber 17 of the mechanism. Throughout the period in which the brake is engaged, the central region 15b of the diaphragm stands in its open position so that the master cylinder is in direct communication with the brake motor via the open port 27 and the inlet and outlet chambers of the adjuster mechanism.

If the brake is released before there is any substantial wear on the linings or distortion of the brake members, the central region 15b of the diaphragm, under the influence of the plunger piston 42 and its spring 44, immediately is flapped to its closed position against valve seat 29 upon release of the hydraulic pressure in the inlet chamber 17. Accordingly, the fluid link is then isolated from the fluid in inlet chamber 17 during the leftward retraction stroke of the piston assembly 10 so that the piston assembly reaches its position of Fig. 1 with the volume of the fluid in the fluid link unchanged throughout the actuation period.

If, however, during the period in which the brake is engaged some noticeable wear occurs in the brake linings and/or there is any expansion or deflection of the brake members, such conditions tend to relieve pressure in the fluid link momentarily. Since the port 27 is open while the brake is engaged, any pressure reduction in the fluid link immediately brings about a corresponding flow of fluid from the inlet chamber through port 27 into the fluid link until full line pressure is restored in the fluid link. The volume of the fluid link is thus progressively increased in this manner to restore full braking pressure between the engageable braking members, thereby compensating for the wear and for the expansion or deflection occurring during the braking operation. The fluid thus added to the fluid link is trapped in the fluid link by the closing of the diaphragm on port 27 as soon as the fluid pressure in the inlet chamber is released. Then when the piston assembly 10 is retracted to its leftward position of Fig. 1, the added volume of fluid trapped in the fluid link automatically relocates the released position of the braking members so that they are separated at the desired preselected release clearance.

In cases where the brake members undergo substantial thermal expansion or deflection, the braking members will be progressively adjusted in the foregoing manner so that they will remain in firm engagement with the brake drum throughout the period the brake is applied, and when the brake is thereafter released the braking members will be retracted to separate them the usual release clearance. The subsequent cooling or spring back of the braking members, however, will materially reduce this release clearance and under some conditions may be of sufficient magnitude to bring the members into pressure engagement again tending to lock the brake even though actuation pressure is released. In the event the latter locking condition occurs, the engagement of the braking members will produce a corresponding increase in pressure in the fluid link which will act through port 27 and against the central region 15b of the diaphragm, eventually overcoming spring 44 and displacing the diaphragm to open port 27. Then some of the fluid in the fluid link can bleed off through port 27 and through annular channel 50, etc. into inlet chamber 17 until pressure in the fluid link is relieved and the braking members are merely in light dragging engagement. These events occur when the piston assembly 10 is in its leftward position in Fig. 1, and this flow can occur because the fluid in the inlet chamber 17 under these circumstances is at the back pressure of the braking system, usually atmospheric pressure.

Whether changes in the positions of the brake members after release merely brings about a slight reduction in the release clearance, or whether it is such as to result in a locking condition to force open diaphragm 15 as described in the preceding paragraph, the desired uniform release clearance between the braking members may be automatically restored by merely depressing the brake pedal momentarily after the brake members have resumed their normal location.

Figure 2:
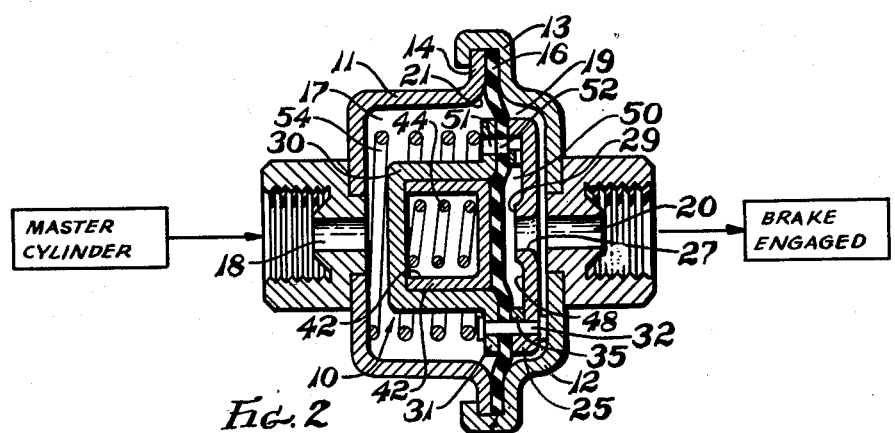
Fig. 2 is a view similar to Fig. 1 but showing the relative positions of the parts of the mechanism when the associated brake is engaged.

When the brake pedal is depressed to reset the release clearance, piston assembly 10 is displaced forwardly from its Fig. 1 position until the brake is firmly engaged in the manner explained previously. However, since the release clearance existing when the pedal is depressed under these circumstances is smaller than the normal release clearance, the brake will be firmly engaged substantially before the piston assembly 10 reaches its bottomed or actuated position against end cap 12 as shown in Fig. 2. But as soon as the brake is engaged, regardless of the particular axial position of the piston assembly 10 in casing 11, the valve diaphragm will be forced open to uncover port 27 by the inlet fluid pressure exerted against the annular portions of the diaphragm opposite channel 50. Thereafter, although the pressure of the fluid acting against the opposing sides of the floating piston assembly 10 is balanced, the piston assembly is moved translationally rightward by the force exerted on it by main spring 54 until the piston assembly 10 is bottomed against end cap 12 in the position in Fig. 2. During this movement the volume of the fluid link is reduced by the amount of fluid spilling backward through port 27 while the piston assembly is advanced by the force of main spring 54. Thereafter as soon as the pedal or master cylinder pressure is released, the central region of the diaphragm again is flapped shut on port 27 and the piston assembly retracts to its position shown in Fig. 1 so that the desired release clearance is restored between the braking members.

In view of the foregoing operation of the mechanism, it may be seen that within the range of the operation of the brake motor, the brake may be maintained in engagement no matter how much the braking members expand or deflect, and by the same token, the brake may be automatically restored to accurate adjusted condition following a severe brake application by merely depressing the brake pedal momentarily. Inasmuch as the central region 15b of the diaphragm may be forced open by predetermined pressure in fluid link, it is not possible to have the brake become locked as the result of an overadjustment of the brake.

Variations in the construction disclosed may be made within the scope of the appended claims.

I claim:

1. Hydraulic adjusting mechanism comprising a casing member, an actuated member in said casing member, a flexible annular diaphragm having a peripheral portion connected to said casing member and also to said actuated member to provide for relative axial movement of said members in sealing engagement with each other, said peripheral portion of the diaphragm and said actuated member defining with the casing member a first chamber to receive fluid for actuating said actuated member and a second chamber to contain fluid displaceable by the actuated member, means for urging said actuated member against fluid contained in said second chamber, a port through said actuated member from said second chamber, and said diaphragm including a central region disposed for covering one end of said port for regulating fluid flow through said port, means biasing said central region of said diaphragm toward a position to close said port, and a passage through said actuated member and said diaphragm communicating portions of said central region of said diaphragm surrounding said valve seat with said first chamber, whereby said central region of said diaphragm is operable for displacement against the opposition of said biasing means to open said port in response to a predetermined fluid pressure in either of said chambers.

2. In a hydraulic adjusting mechanism, a casing member, an actuated member in said casing member, a port through said actuated member, a flexible diaphragm disposed transaxially of the interior of said casing member, said diaphragm including a central region disposed for covering said port at one end thereof, and said diaphragm including an annular peripheral portion fastened at the boundary of said central region to said actuated member and also fastened at the outermost margins thereof to said casing member, said peripheral portion and said actuated member defining with the casing member a first chamber to receive fluid for actuating said actuated member and a second chamber to contain fluid displaceable by the actuated member, means carried by said actuated member for biasing said central region of said diaphragm toward a position to close said port, and a passage in said actuated member and in said peripheral portion of the diaphragm which is fastened to said actuated member for communicating said first chamber with that side of said central region directed toward and surrounding said end of said port, said central region being displaceable to overcome said biasing means to open said port in response to a predetermined pressure of fluid either in said first chamber acting through said passage or in said second chamber acting through said port.

3. In a hydraulic adjusting mechanism, a casing member, an actuated member therein, a flat flexible disc-shaped diaphragm disposed transaxially of the casing member, said diaphragm having its peripheral margin connected in sealing engagement with the casing member and said diaphragm also being connected in sealing engagement with said actuated member continuously along an annular interamarginal region thereof to provide for relative axial movement of said members, said actuated member together with said diaphragm defining with said casing member a first chamber to receive fluid for actuating said actuated member and a second chamber to contain fluid displaceable by the actuated member, a port leading through said actuated member from said second chamber to an end of the port across which is disposed the central region of said diaphragm, a valve seat at said end of said port engageable by the central region of said diaprhagm to close said port, means carried on said actuated member for biasing said central region against said valve seat, an annular channel surrounding said valve seat between said diaphragm and said actuated member and communicating with said port when said port is open, and a passage in said actuated member and through said diaphragm communicating said first chamber with said channel whereby said central region of the diaphragm is displaceable to overcome said biasing means to open said port in response to a predetermined pressure of fluid either in said first chamber acting through said passage or in said second chamber acting through said port.

4. Hydraulic adjusting mechanism comprising two cup-shaped casing members with means for introducing fluid into said casing members and with rim flanges thereon, said casing members being assembled together with their rim flanges adjoining; a flexible annular disc-like diaphragm disposed transaxially between the casing members with the peripheral margins of the diaphragm engaged between said rim flanges; a plate member fastened in sealed engagement at its margins to one side of the central region of said diaphragm inside the casing members, said plate having a port therethrough one end of which is covered by the central region of said diaphragm, and said plate having surfaces forming an annular channel surrounding the covered end of said port between said plate and said central region of the diaphragm; a passage through said central region of the diaphragm between the portion thereof against which the plate margins are sealed and the portion covering said port, said passage communicating the side of the diaphragm opposite said plate with said channel; means on said opposite side of said diaphragm but engaged with said plate for biasing the central region of said diaphragm normally to a position to close said port, said central region of the diaphragm being displaceable against said biasing means to open said port in response to the force of fluid pressure on said opposite side of the diaphragm communicated to said channel through said passage, or in response to the force of fluid pressure on said one side of the diaphragm communicated through said port; and a main spring caged in one of said casing members and axially biasing said central region and said plate member thereon toward the other casing member.

5. Hydraulic adjusting mechanism comprising two cup-shaped casing members with rim flanges and coupling fittings for introducing fluid into said casing members; a generally flat flexible diaphragm disposed transaxially between said casing members with the margin of the diaphragm sealingly engaged between said rim flanges and with its central region displaceable axially relative to said rim flanges, a plate member positioned against one side of said diaphragm at the central portion thereof with the periphery of the plate fastened in sealed engagement with the diaphragm, said plate member having a port therethrough which is covered and closed by the central region of the diaphragm, and said plate member having surfaces directed toward the diaphragm to form an annular channel surrounding the end of the port closed by the diaphragm; a closed cup-shaped housing positioned against the opposite side of said central region of the diaphragm and having its rim portion surrounding the diaphragm portion closing said port, said rim portion being fastened in sealing engagement with said opposite side of the diaphragm; a member slidable in said housing and a spring in said housing biasing said slidable member against the central portion of the diaphragm to close said port; a passage through the rim of said housing and through the diaphragm in a location between its portion sealed against said rim and its portion closing said port, the passage communicating with said channel; and a main spring externally surrounding said housing in one casing member and axially biasing said central region of the diaphragm including the assembly of said housing and said plate toward the other casing member.

6. Mechanism according to claim 5 and further including means to restrict the axial displacement of the central region of the diaphragm (together with said housing and said plate) relative to the casing members between predetermined limits.

References Cited in the file of this patent
UNITED STATES PATENTS

| | | |
|---|---|---|
| 368,089 | Hinds | Aug. 9, 1887 |
| 2,513,015 | Fike | June 27, 1950 |